Figure 1:
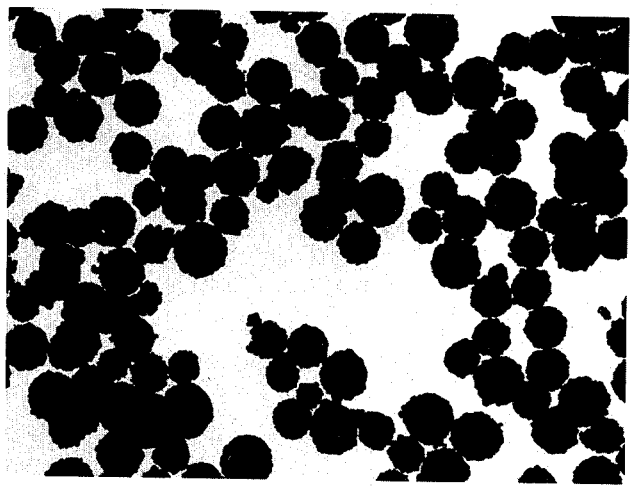

United States Patent [19]

Matijevic et al.

[11] Patent Number: 4,675,251
[45] Date of Patent: Jun. 23, 1987

[54] SPHERICAL PARTICLES OF TITANIUM DIOXIDE COATED WITH A UNIFORM LAYER OF IRON OXIDES HAVING A NARROW SIZE DISTRIBUTION, AND PROCESS FOR PREPARING THE SAME

[75] Inventors: Egon Matijevic, Potsdam, N.Y.; Paola Gherardi, Novara, Italy

[73] Assignee: Montedison S.p.A., Milan, Italy

[21] Appl. No.: 829,962

[22] Filed: Feb. 18, 1986

[30] Foreign Application Priority Data

Feb. 20, 1985 [IT] Italy .................. 19578 A/85

[51] Int. Cl.$^4$ .................. B32B 19/04; C09C 1/36
[52] U.S. Cl. .................. 428/404; 427/215; 427/216; 427/218
[58] Field of Search .................. 427/215, 216, 218; 428/404

[56] References Cited

U.S. PATENT DOCUMENTS 4,241,042 12/1980 Matijevic et al. .................. 423/592
4,309,480 1/1982 Armaini .................. 428/404
4,574,078 3/1986 Cortesi et al. .................. 423/592

Primary Examiner—James C. Cannon
Attorney, Agent, or Firm—Stevens, Davis, Miller & Mosher

[57] ABSTRACT

Spherical particles having sizes below 1 μm, or at maximum of 3.04 μm, a narrow size size distribution consisting, or consisting essentially, of $TiO_2$ coated by a uniform layer having a thickness up to 400 Å consisting essentially α-, or γ-$Fe_2O_3$, or magnetite, or mixtures thereof, said particles being prepared by a process consisting, or consisting essentially, in the precipitation of the oxide from Fe (III) salt solutions on the surface of solid pre-formed $TiO_2$ particles having a narrow size distribution and a number average diameter below 1 μm or ≦3 μm, the Fe (III) concentration being ≦40% by weight calculated on $TiO_2$, the pH of the suspension ranging from 1.0 to 2.8, extremes excluded, by heating the suspensions to temperatures of from 80° to 100° C., and by aging them under such conditions for at least 30 minutes.

18 Claims, 5 Drawing Figures

SPHERICAL PARTICLES OF TITANIUM DIOXIDE COATED WITH A UNIFORM LAYER OF IRON OXIDES HAVING A NARROW SIZE DISTRIBUTION, AND PROCESS FOR PREPARING THE SAME

This invention relates to the preparation of solid, non-aggregated particles of titanium dioxide coated with iron oxides.

More particularly, the invention relates to spherical particles having a low polydispersion index, as defined hereinafter, and sizes below one micron or, at maximum, of a few microns.

It is known that titanium dioxide can be prepared in the form of spherical, non-aggregated, monodispersed or polydispersed particles having a low polydispersion index, the sizes of such particles ranging from 0.05 to about 3 $\mu$m.

U.S. Pat. No. 4,241,042 describes such titanium dioxide spherical particles and a method of preparing the same. As is well known, titanium dioxide having the characteristics cited hereinabove exhibits improved properties in all the fields of use in which this dioxide is employed.

In particular, if the polydispersion index is 1.2, the properties of the titanium dioxide pigments are improved as regards the purity of the color and the optical characteristics.

The titanium dioxide having the above-mentioned characteristics is utilizable as a catalyst since, if it consists of very small particles, it has a very great specific surface area and, in consequence, a higher catalytic activity.

When titanium dioxide is utilized for preparing colored pigments, it is mechanically or chemically mixed with various substances, in particular oxides, which impart the color.

The pigmentary properties of the mixtures depend on the particle size of the added colored oxides.

These mixtures, however, do not retain the superior pigmentary qualities exhibited by the titanium dioxide as such, as the pigment appears to be non-homogeneous, thus giving rise to color variations from one point to another of the coated area.

The global or overall balance of the properties of these mixtures generally results in a loss of the improvements which were intrinsic in titanium dioxide having the characteristics described in the above-cited U.S. Pat. No. 4,241,042.

Iron oxides in the form of spherical, non-aggregated, sub-micronic particles are also known. Also in this case, however, if colored pigments exhibiting other color shades than those of the starting iron oxide are to be obtained, it is necessary to mix them with white pigments, generally with titanium dioxide. The mechanical or chemical mixtures of these oxides give rise to the same drawbacks already mentioned; in particular, non-homogeneity and lower color intensity phenomena due to the low homogeneity of the mixtures. An attempt at improving the uniformity of the mixtures by carrying out very fine grindings leads to a disaggregation of the uniform spherical particles of the oxides employed as precursors, with consequent loss of all of the highly desirable characteristics which are due to the morphology of the starting particles.

The non-homogeneities of the pigment occur even if various oxides having nearly the same morphological and granulometric characteristics are mixed together. In the case of mechanical mixtures, furthermore, the products contain impurities deriving from the mechanical means utilized to carry out the mixing.

For applications in the diagnostic field or as toners, there was the requirement of materials—even if not thoroughly magnetic—having, however, a homgeneous surface coating made of magnetic material, as even such a small superficial amount is sufficient for said purposes. In fact, however, mechanical mixtures of the oxides exhibit non-homogeneity phenomena, which render them non-utilizable for said uses.

The present invention makes it possible to overcome the cited drawbacks and provides spherical, non-aggregated particles having a narrow size distribution, which can be utilized in the pigmentary field in order to obtain differently colored pigments and which, if subjected to particular treatments, permit one to obtain particles consisting of an inert core coated with a magnetic material, which can be utilized in the diagnostic field or as a toner for photostatic reproductions.

With the spherical particles of the present invention, it is possible to obtain systems which combine the properties of the titanium dioxide consisting, or consisting essentially, of spherical particles having a narrow size distribution with the properties of the supported oxides, which leads to a considerable increase in the magnetic and pigmentary properties, as compared with those obtained in the prior art, by using mixtures of the abovesaid oxides.

It has, surprisingly, been found that it is possible to prepare titanium dioxide coated with an iron oxide layer which retains the same granulometric and morphological characteristics of the titanium dioxide used as a support.

The spherical particles of the invention have a number average diameter higher than 0.05 and up to 3.04 $\mu$m, a polydispersion index dw/dn $\leq$ 2.0, in which dw is the weight average diameter and dn is the number average diameter, consisting, or consisting essentially, of titanium dioxide coated with a uniform layer up to a thickness of 400 Å, and consisting essentially of $\alpha$- or $\gamma$-Fe$_2$O$_3$, or magnetite, or mixtures thereof.

For applications in the pigmentary field, the spherical particles of the invention having a polydispersion index $\leq$ 1.20 and a diameter ranging from 0.2 to 0.8 $\mu$m are preferably used.

The term "monodispersed particles", whenever used herein, means particles having a polydispersion index of dw/dn $\leq$ 1.20.

The surface layer may vary from a few Å to about 400 Å, and preferably from 10 to 300 Å. The average dimensions (dw and dn), as well as the morphological and granulometric characteristics, are determined under the electron microscope by means of the transmission technique (TEM). The method of determining dw and dn is described by E. A. Collins, J. A. Davidson and C. A. Daniels in "Review of Common Methods of Particle Size Measurement", *Journal of Paint Technology*, Vol. 47, No. 604, May 1975.

The titanium dioxide utilized herein may be in the form of crystalline anatase, or rutile, or mixtures thereof, as is described in U.S. Pat. No. 4,241,042.

The determination of the crystalline phase of titanium dioxide, of $\alpha$- or $\gamma$-Fe$_2$O$_3$, and of magnetite, is carried out by the X-ray powder diffraction spectrum according to the methods listed hereinbelow:

for $\alpha$-Fe$_2$O$_3$: Method JCPDS No. 33-664

For γ-Fe$_2$O$_3$: Method JCPDS No. 25-1402
For Magnetite: Method JCPDS No. 19-629
For TiO$_2$ (Anatase): Method JCPDS No. 21-1272

The thickness of the iron oxide surface layer deposited onto TiO$_2$ and its uniformity are measured by the Auger technique accompanied by an ionic bombardment, operating under the following conditions. A sample of the powder of the invention is introduced into an Auger spectrometer, the device being subjected to such conditions as to obtain an Auger spectrum of the sample surface. An ionic cannon is then started in order to bombard the same sample area with a beam of positive argon ions, such as to cause erosion of the sample. During the ionic bombardment various Auger spectra are drawn, by means of which a curve of the intensities (heights) of the Auger peaks in the spectrum versus the bombardment time is plotted.

Once the composition profile has been so obtained, it is possible to substitute the time variable in the abscissa with the erosion depth by means of a proper calibration and operating under the same test conditions on a layer having a known thickness. The thickness of the surface layer corresponds to the point, measured at the half height, of a variable (height of an Auger peak), which increases (or decreases) as a function of the thickness, between two stable starting and ending levels.

This technique is described in general in *Practical Surface Analysis*, ed. by David Briggs and M. P. Seah, Chapter 4.

It has been furthermore surprisingly found, and this is a further object of the present invention, that the particles of titanium dioxide coated with α-Fe$_2$O$_3$ may be subjected to treatments in order to transform α-Fe$_2$O$_3$ *into an oxide having magnetic characteristics, always retaining the above-mentioned morphological and granulometric characteristics.*

By subjecting to reduction, according to conventional techniques, the oxide coated with α-Fe$_2$O$_3$ at temperatures ranging from 300° to 500° C. in a hydrogen stream diluted with inert gas, and containing water vapor and carbon monoxide, titanium dioxide coated by a magnetic layer is obtained.

By subjecting the magnetite-coated titanium dioxide to a subsequent oxidation, titanium dioxide coated with γ-Fe$_2$O$_3$ is obtained. Generally, oxidation is accomplished according to conventional methods at temperatures of the order of 300° to 400° C. during a few hours.

The magnetic characteristics of the TiO$_2$ powders coated with magnetite Fe$_3$O$_4$ or γ-Fe$_2$O$_3$ have been measured by a vibrating sample magnetometer produced by Varian. The measured magnitudes are:

Hci in Öersted (intrinsic coercivity), the necessary field to reduce magnetization M$_s$ to zero;

$\sigma_s$ (emu/g) saturation magnetization; this is an intrinsic parameter for each material and can be calculated by the formula: $\sigma_s = M_s/\rho$, where $\rho$ is the material density, and M$_s$ is the saturation magnetization which is obtained when the material is saturated with a magnetic field of 18 KGauss. $\sigma_s$ is influenced by the purity of the material, while Hci is the magnetic force required to demagnetize the material. The higher the Hci, the better the magnetic characteristics of the material.

$\sigma_s$ in the present invention cannot be correlated to the theoretical $\sigma_s$, as the material is not pure but contains a core of TiO$_2$.

The $\sigma_s$ values are then compared with the values obtained for mechanical or chemical mixtures of TiO$_2$ and α-Fe$_2$O$_3$, subjected to treatments suitable to transform α-Fe$_2$O$_3$ into γ-Fe$_2$O$_3$ and/or magnetite, as described hereinbefore.

The Hci values of the titanium dioxide coated with magnetite of the present invention are surprisingly higher than those of the mechanical mixtures, because TiO$_2$ probably exerts a certain influence on the growth of the crystalline structure of α-Fe$_2$O$_3$, and subsequently on the growth of the magnetite obtained by reduction, as explained above.

In fact, Hci depends on the shape of the particles (shape-anisotropy) and on the structure of the magnetic material (magnetocrystalline anisotropy), as this is an extrinsic property.

The unexpected variation of Hci can be explained by the fact that a few particles of iron oxide in the mechanical mixture exhibit lower diameters than the critical diameter, wherefore the material would turn out to be superparamagnetic.

The value of $\sigma_s$ of the mixture, extremely low with respect to the products of the present invention, appears to be surprising and can be explained by the fact that the oxide mixtures are utterly non-homogeneous. From a practical viewpoint, however, the characteristics of the mixtures utilized for photostatic reproduction systems (toner) are not constant, which markedly limits the use thereof. The magnetic oxides of the invention, conversely, are utilizable for such application.

Furthermore, the products of this invention, as they consist of particles which are all homogeneously coated with magnetic material, are employable also for diagnostic uses, as the particles may be obtained also in a monodispersed form and with sizes far below one micron.

In such case, the specific adsorption capability, for example with respect to enzymes, turns out to be extremely high.

The Hci values of the titanium dioxide coated with γ-Fe$_2$O$_3$ are lower than those of titanium dioxide coated with magnetite, because in the case of γ-Fe$_2$O$_3$ the magnetic values depend on the needle-like shape of the particles, such shape being probably not obtained in the presence of TiO$_2$. However, also in this case, the TiO$_2$ particles coated with γ-Fe$_2$O$_3$, or mixtures thereof with magnetite, can be utilized for diagnostic purposes or as toners.

The oxides of the present invention are prepared from Fe (III) solutions in the presence of spherical, non-aggregated particles, monodispersed or polydispersed with a polydispersion index ≦2.0, provided the amount of Fe (III) with respect to TiO$_2$ is ≦40% by weight and the pH of the solution is in the range of from 1.0 to 2.8, extremes excluded, by heating the suspensions to temperatures (T) ranging from 80° to 100° C., and aging them at these temperatures for a time (t) of at least 30 minutes.

In particular, it is preferably to operate at pH values from 1.6 to 2.0 and at concentrations of Fe (III) referred to TiO$_2$, which are ≦30% by weight.

Preferably, one operates at temperatures from 90° to 100° C. and for times of about 20 hours.

It is possible to operate at atmospheric pressure or at higher pressures; in the latter case, the time required for the iron oxides to deposit onto TiO$_2$ decreases.

The salts of Fe (III) which may be utilized are selected from the class consisting of sulphates, chlorides, perchlorates, and nitrates. Preferably, FeCl$_3$ solutions are used and the pH is brought to the desired value with HCl or HClO$_4$.

The titanium dioxide utilized in the present invention may be in the crystalline form of anatase, rutile or mixtures thereof. It is prepared according to known methods, such as, for example, those cited in U.S. Pat. No. 4,241,042 or in the European Patent Application No. 117,755.

It is possible to operate without stirring or with a slow stirring in order to promote the dispersion of the $TiO_2$ particles in the solution. Furthermore, it has been found—this being a further feature of the invention—that it is possible to improve the regularity of the coating layer of the oxides of the invention if the $TiO_2$ particles are treated in an aqueous solution with heteropolyacids under the pH conditions at which the coating is to be carried out, by successively washing the $TiO_2$ particles in order to remove the excess of heteropolyacids, and then by operating under the above-mentioned precipitation conditions.

The heteropolyacids which can be employed, and which are also the preferred ones, are $H_7PW_{12}O_{42}$ (tungstophosphoric acid) and $H_4SiW_{12}O_{40}$ (tungstosilicic acid), the heteropolyacid concentration generally varying from $10^{-5}$ to $10^{-4}$ moles/l.

The titanium dioxides coated with the iron oxides of the present invention are utilizable also as pigments having superior properties with respect to those obtained by mechanically mixing $\alpha$-$Fe_2O_3$, or $\gamma$-$Fe_2O_3$, or magnetite, or mixtures thereof with $TiO_2$, also if $TiO_2$ is in the monodispersed or polydispersed form, as already described above.

The $TiO_2$ oxides coated with $\alpha$-$Fe_2O_3$ of this invention exhibit, when they are utilized as pigments, a higher homogeneity, a low permeability to gases, no color change due to exposure to light, and a good brightness.

The pigmentary films, moreover, retain these characteristics over long stretches of time and do not exhibit peeling off phenomena, i.e., the surface layer of the iron oxides does not detach from the support particles.

The hiding power is higher and the color is improved, as compared with the mixtures of the abovesaid oxides.

The $TiO_2$ oxides having the characteristics indicated hereinabove, when they are coated with a magnetic layer of $Fe_3O_4$, are useful as toners or in the diagnostic field, as already explained.

The oxides of the invention, based on $TiO_2$ and coacted with $\alpha$-$Fe_2O_3$, may be further subjected to doping treatments by Co, Ni, or Cr oxides in order to improve the magnetic properties of the product in the subsequent magnetization step. The amounts of the metal oxides utilized as doping agents may generally vary from 0.05 to 10% by weight, calculated as metal with respect to the amounts of Fe supported on $TiO_2$. Doping is preferably carried out by treating the oxides of the invention, which are already pre-formed, with solutions of Co, Ni, Cr salts, operating at temperatures ranging from 50° to 100° C. for a time of a few hours, in general, and at basic pH values, such as of the order of 8.

After the doping step, the product according to the present invention retains the morphological and granulometric characteristics of the coated oxides.

The invention is still further illustrated by means of the accompanying five figures of drawings, wherein the fine structure of certain of the products more fully identified below is shown.

The following examples are given merely to illustrate the invention, without, however, being a limitation thereof.

PREPARATION OF THE STANDARD SOLUTIONS

A. 1 g of $TiO_2$ powder ($\phi=0.44$ $\mu$m; dw/dn=1.12), in the crystallographic form of anatase, was suspended by ultrasonification in 1000 cc of twice-distilled $H_2O$ filtered on a Nuclepore filter 0.2 $\mu$m. The suspension was allowed to rest during a time varying from 2 to 15 days in order to bring about hydration of the $TiO_2$.

B. 580 g of anhydrous $FeCl_3$ (min. titer 99% by weight) were dissolved in 1000 cc of twice-distilled $H_2O$ filtered on a Nuclepore filter 0.2 $\mu$m, thus obtaining a solution stable to hydrolysis over a long time owing to the high acidity.

EXAMPLE 1

1 cc of suspension A was transferred, after homogenization by ultrasonification, into a test tube. It was then additioned with 1.5 cc of 0.2M HCL and 0.42 cc of a solution prepared by diluting 1 cc of solution B to 250 cc with twice-distilled water filtered on a Nuclepore filter 0.2 $\mu$m.

The final volume of the suspension was brought to 30 cc with twice-distilled $H_2O$ (pH=1.95) and, without stirring, the suspension (in the test tube closed by a screw plug) was maintained at T=100° C. during 24 hours. The TEM analysis of the product is shown in FIG. 1.

The $TiO_2$ turns out to be coated by a uniform $\alpha$-$Fe_2O_3$ layer of about 350 Å. The product analysis, carried out by X-ray diffraction of the powders, revealed that the iron oxide precipitated as $\alpha$-$Fe_2O_3$ according to standard JCPDS No. 33-664.

EXAMPLE 1(A)

(Comparative Test)

Figure 2:
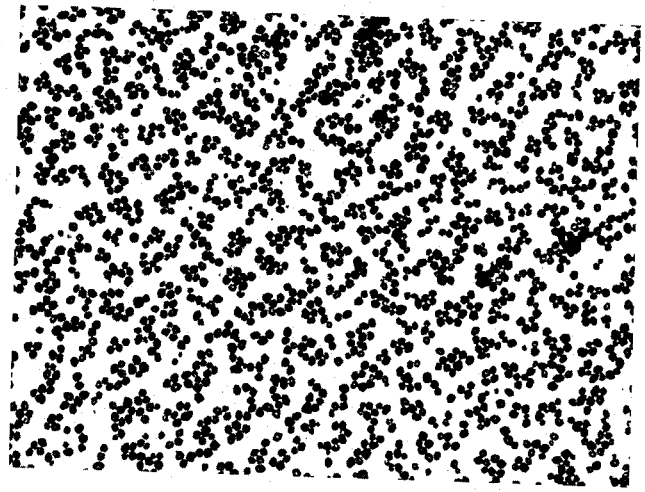

Example 1 was repeated according to the same procedure, but without the addition of $TiO_2$. The results are shown in FIG. 2, and show that under these operating conditions the iron oxide precipitated. A comparison between Example 1 and Example 1 (A) reveals that in Example 1 all the iron oxide precipitates onto the $TiO_2$ surface.

EXAMPLES 2–4

(Comparative Tests)

Figure 3:
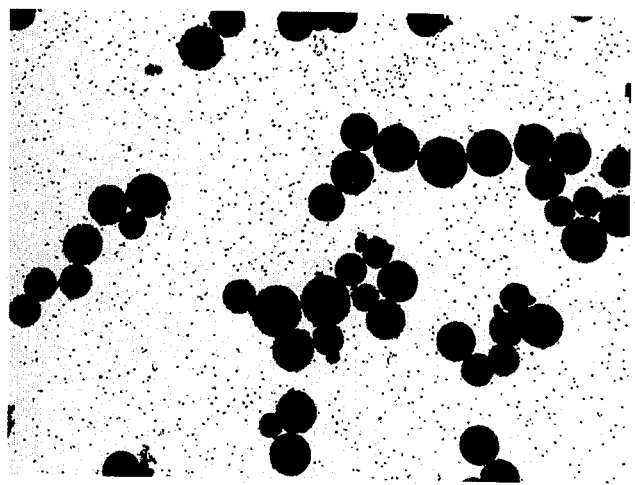

Operation was as in Example 1, but using, respectively, 1.5 cc of HCL $2.10^{-3}$M, 1.5 cc of HCL $2.10^{-2}$M, and 3.0 cc of HCL 1M, and maintaining the total final volume of the suspension equal to 30 cc. The micrographics by means of TEM show that lower or higher amounts of acid with respect to Example 1 caused, respectively, a precipitation of the iron oxide (Examples 2 and 3) in solution, and non-precipitation of the oxide (Example 4). A micrograph of Example 2 is shown in FIG. 3.

EXAMPLE 5

(Comparative Test)

Figure 4:
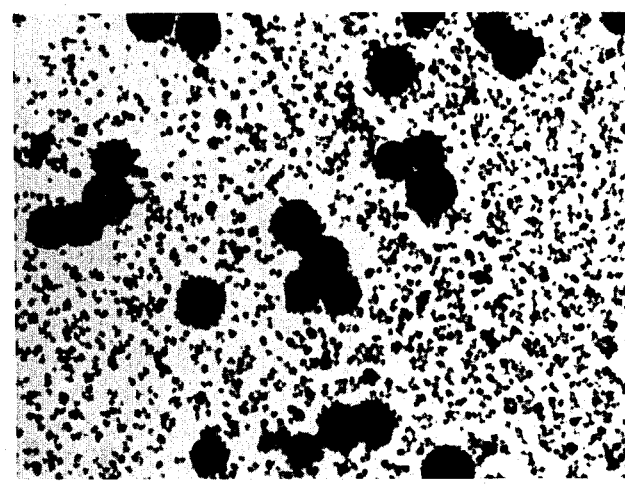

Example 1 was repeated, but using 4.2 cc of $FeCl_3$ solution obtained by diluting 1 cc of solution B to 250 cc with twice-distilled $H_2O$ filtered on Nuclepore filter 0.2 $\mu$m. The test results are shown in FIG. 4. The obtained results prove that no complete surface precipitation was obtained, as the presence of an excess of $\alpha$-Fe$_2$O$_3$ can be observed.

EXAMPLE 6

(Comparative Test)

Figure 5:
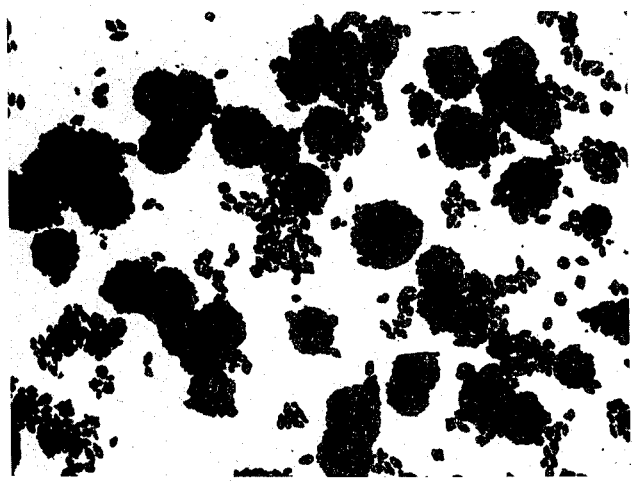

Example 5 was repeated, using 2.5 cc of HCL 0.2M. The results shown in FIG. 5 were obtained.

There was an increase in the surface precipitation; the polydispersion, however, was higher than 2.0 and aggregates were present.

EXAMPLE 7

Example 6 was repeated, using 15 cc of suspension A and maintaining all the other parameters unaltered.

The final total volume was maintained at 30 cc and the results obtained are like those shown in FIG. 1. The percentage by weight of Fe (III) on TiO$_2$ was 20%, and the thickness, measured by the Auger analysis, was equal to 250 Å.

A sample, prepared according to the procedure of Example 7, was subdivided into various fractions; in each fraction the pH was changed by addition of a NaOH solution in order to plot the electrophoretic mobility curve of the sample. The curve shows that the surface electric behavior of the sample is fully identical with that of a sol of $\alpha$-Fe$_2$O$_3$, prepared according to Example 6, not using TiO$_2$.

The isoelectric point is obtained at a pH=7.2, both for the sample of Example 7 and for the comparative sol of $\alpha$-Fe$_2$O$_3$ indicated hereinbefore.

EXAMPLE 8

(Comparative Test)

Example 1 was repeated, carrying out a forced hydrolysis at T=75° C. during 24 hours. The micrographics by means of TEM show that $\alpha$-Fe$_2$O$_3$ did not homogeneously deposit onto the TiO$_2$ particles. The same test, repeated over a period of 7 days, evidenced the abovesaid phenomenon and the particles lost their sphericity characteristic.

EXAMPLE 9

(Comparative Test)

Example 7 was repeated, using, instead of TiO$_2$, 15 cc of a suspension prepared by dispersion (through ultrasonics) of 1 g of $\gamma$-Al$_2$O$_3$ ($\phi$=0.25 $\mu$m; dw/dn=1.18) in 1000 cc of twice-distilled H$_2$O filtered on Nuclepore 0.2 $\mu$m, and maintaining all the remaining parameters unchanged.

$\gamma$-Al$_2$O$_3$ was prepared as follows: 10 g of Al$_2$O$_3$.3-H$_2$O, having dn=0.32 $\mu$m, a polydispersion index dw/dn=1.17, in a spherical, non-aggregated form, was obtained via aerosol, according to Example 1 of the published patent EP No. 117,755, but changing the following conditions:
the dry N$_2$ flowrate, at a temperature of 158° C., was 200 l/h, the gas carried 7.4 g/h of aluminum sec.butoxide; the second gas stream consisted of dry N$_2$ at a temperature of 0° C. at a flowrate of 400 l/h; the Reynolds number was 1800.

The aerosol was formed at a temperature of 53° C.

The contact time in the hydrolysis chamber was 57 seconds, the ratio: moles of H$_2$O/moles of Al sec.butoxide was equal to 8.

The product so prepared was subjected to a heat treatment at 800° C. during a period of 4 hours.

The X-ray analysis of the powder spectrum reveals that the product is $\gamma$-Al$_2$O$_3$ (% by weight of H$_2$O of about 3), according to standard JCPDS No. 14-425.

Under TEM, dn was 0.25 $\mu$m, and the product exhibits the same granulometric and morphological characteristics as the precursor (dw/dn=1.18).

The results obtained show that no homogeneous surface coating is obtained and that the particles are aggregated if a support other than TiO$_2$ is utilized, although it has nearly the same morphological and granulometric characteristics of titanium dioxide.

EXAMPLE 10

(Comparative Test)

The blank test of Example 1 (A) was repeated under the same conditions, and to the iron oxide suspension so obtained there was added 1 mg of the TiO$_2$ powder utilized in the preceding tests. The mixture of the two sols was brought to a T=100° C.±1° C. during 24 hours. The result obtained shows a heterocoagulation of the particles, i.e., a chemical mixing of the two oxides without uniform deposition of $\alpha$-Fe$_2$O$_3$ onto TiO$_2$.

EXAMPLE 11

100 mg of the sample prepared according to Example 7, after washing with H$_2$O in order to remove any residual acidity, was subjected to a reducing treatment comprising the following steps:
heating in a N$_2$ flow (10 l/h) up to 400° C. (2 hours);
reduction at T=400° C. during 90 minutes by means of a mixture of 5.3% by volume of H$_2$ in N$_2$ flowing through a bubbler kept at such a temperature as to obtain a molar ratio H$_2$:H$_2$O=3:1;
cooling in a N$_2$ flow to room temperature.

The discharged sample appeared, under X-ray analysis, to consist of TiO$_2$ (anatase) and Fe$_3$O$_4$ (magnetite). The sample, subjected to TEM, exhibited the same granulometric and morphological characteristics as those of Example 7.

Magnetic characteristics carried out on the powder so obtined provided the following results:
Hci=355 Oe
$\sigma_s$=10.1 emu/g

EXAMPLE 12

(Comparative Test)

4.2 cc of a FeCl$_3$ solution prepared by diluting 1 cc of solution B to 250 cc with twice-distilled H$_2$O filtered on Nuclepore 0.2 $\mu$m, 2.5 cc of HCl 0.2M, and 23.3 cc of twice-distilled H$_2$O were maintained at T=100° C.±1° C. during 24 hours in a closed and non-stirred system. After such period, the suspension was filtered and the precipitate, collected from 20 identical tests, was united with 300 mg of TiO$_2$ having the granulometric characteristics indicated above under "standard solution A".

The two solid oxides were mechanically mixed in a mortar and subjected to reduction under the same conditions as indicated in Example 11. The magnetic analysis provided the following results:
Hci=245 Oe
$\sigma_s$=1.65 emu/g

EXAMPLE 12(A)

(Comparative Test)

Example 10 was repeated, employing the $FeCl_3$ and HCl concentrations of Example 7. 15 mg of $TiO_2$ were added to the suspension obtained. The sample was reduced under the same conditions indicated in Example 11.

The magnetic characteristics of the resulting chemical mixture are similar to those indicated in Example 12.

EXAMPLE 13

The sample of $TiO_2$, coated with $Fe_3O_4$ obtained according to Example 11, was reoxidized, under controlled conditions, to $\gamma$-$Fe_2O_3$.

The treatment was accomplished by heating the sample in an air flow (10 l/h) to 350° C. (1 hour and 30 minutes), maintaining a temperature of 350° C. during 30 minutes, and then cooling the product by inertia.

The discharged material appeared, under X-ray analysis, to consist of $TiO_2$ (anatase) and of a uniform coating layer consisting of $Fe_3O_4$ (about 30%) and $\gamma$-$Fe_2O_3$ (about 70%).

The magnetic tests provided the following results:
Hci = 220 Oe
$\sigma_s$ = 12.2 emu/g

EXAMPLES 14–20

Effect of $TiO_2$ Amounts

| T = 100° C.; | t = 24 Hours; | HCl = $1.7 \cdot 10^{-2}$ M | |
|---|---|---|---|
| | | $TiO_2$ (mg/l) | |
| $FeCl_3$ (M) | 35 | 100 | 500 |
| $2 \cdot 10^{-4}$ | — | SP | SP |
| $2 \cdot 10^{-3}$ | PI | PI | SP |
| $2 \cdot 10^{-2}$ | — | PI | PI |

SI = stable dispersions of independent particles of $TiO_2$ and $Fe_2O_3$;
PI = partial interaction between $TiO_2$ and $Fe_2O_3$;
SP = superficial precipitation of $Fe_2O_3$ onto $TiO_2$;
NP = no precipitation of $Fe_2O_3$;
— = not carried out.

EXAMPLES 21–37

| | 35 mg/l of $TiO_2$; | | T = 100° C.; | | t = 24 hours | | |
|---|---|---|---|---|---|---|---|
| | | | HCl (M) | | | | |
| $FeCl_3$ (M) | 0 | $1 \cdot 10^{-4}$ | $1 \cdot 10^{-3}$ | $5 \cdot 10^{-3}$ | $8 \cdot 10^{-3}$ | $1 \cdot 10^{-2}$ | $2 \cdot 10^{-2}$ | $1 \cdot 10^{-1}$ |
| $2 \cdot 10^{-4}$ | SI | PI | PI | SP | SP | SP | — | NP |
| $2 \cdot 10^{-3}$ | SI | SI | PI | — | — | PI | PI | NP |
| $2 \cdot 10^{-2}$ | SI | — | SI | — | — | SI | SI | — |

SI = stable dispersion of independent particles of $TiO_2$ and $Fe_2O_3$;
PI = partial interaction between $TiO_2$ and $Fe_2O_3$;
SP = superficial precipitation of $Fe_2O_3$ onto $TiO_2$;
NP = no precipitation of $Fe_2O_3$;
— = not carried out.

EXAMPLE 38

Example 1 was repeated, utilizing 1 cc of solution A prepared as is described for the preparation of the standard solutions, but using 1 g of $TiO_2$ in powder having $\phi = 0.08$ μm and dw/dn = 1.19.

The $TiO_2$ was obtained according to the technique described in U.S. Pat. No. 4,241,042.

The results obtained are similar to those obtained in Example 1.

EXAMPLE 39

Example 38 was repeated, using 1 cc of a solution A prepared by utilizing 1 g of $TiO_2$ in powder having $\phi = 0.84$ μm and dw/dn = 1.15.

The $TiO_2$ was prepared according to the technique described in U.S. Pat. No. 4,241,042.

The results obtained are similar to those obtained in Example 38.

EXAMPLE 40

Example 38 was repeated, using $TiO_2$ powder having $\phi = 2.98$ μm and dw/dn = 1.19, prepared according to the technique described in U.S. Pat. No. 4,241,042.

The results obtained are similar to those obtained in Example 1.

EXAMPLE 41

Example 38 was repeated, using 1 g of $TiO_2$ having $\phi = 0.82$ μm and dw/dn = 1.07 to prepare solution A, said $TiO_2$ being obtained according to Example 1 of published Europena Patent Application EP No. 117,755.

The results obtained are similar to those obtained in Example 1.

EXAMPLE 42

The product obtained according to Example 41 was subjected to the same oxidizing treatment as indicated in Example 11.

The sample obtained exhibits characteristics like those indicated in Example 11.

EXAMPLE 43

The product obtained according to Example 42 was subjected to the same oxidizing treatment as indicated in Example 13. The results obtained are like those obtained in Example 13.

What is claimed is:

1. Sperical non-aggregated particles having a number average diameter higher than 0.05 and up to 3.04 μm, a polydispersion index dw/dn ≦ 2.0, in which dw is the weight average diameter and dn is the number average diameter, and consisting essentially of titanium dioxide coated by a uniform layer having a thickness up to 400 Å and consisting essentially of α- or $\gamma$-$Fe_2O_3$, or magnetite, or mixtures thereof.

2. Spherical particles according to claim 1, in which the uniform layer has a thickness ranging from 10 to 300 Å.

3. Spherical particles according to claim 1, in which the number average diameter ranges from 0.2 to 0.8 μm.

4. Spherical particles according to claim 1, in which the polydispersion index dw/dn is ≦ 1.20.

5. Spherical particles according to claim 1, in which the layer coating the titanium dioxide consists essentially of $\alpha\text{-}Fe_2O_3$.

6. Spherical particles according to claim 5, in which the coating layer consists essentially of magnetite prepared by subjecting the particles of claim 5 to reduction at a temperature of about 400° C. in a hydrogen stream.

7. Spherical particles according to claim 6, in which the coating layer consists essentially of $\gamma\text{-}Fe_2O_3$ which has been obtained by subjecting the particles of claim 6 to oxidation at about 350° C.

8. A process for preparing the spherical particles according to claim 1, characterized in that an iron oxide is caused to precipitate from solutions of a Fe (III) salt onto titanium dioxide, consisting essentially of solid, non-aggregated particles having a number average diameter ranging from 0.05 to 3 μm, a polydispersion index $dw/dn \leq 2$, in which dw and dn are the same as defined hereinbefore, said particles having a spherical form, by using an amount of FE (III) $\leq 40\%$ by weight calculated on $TiO_2$, the pH value of the solution ranging from 1.0 to 2.8, extremes excluded, by subsequently heating the suspensions to temperatures from 80° to 100° C., and by aging them at these temperatures for at least 30 minutes.

9. The process according to claim 8, in which the temperature ranges from 90° to 100° C. and the aging time employed is at least 2 hours, at said temperature.

10. The process according to claim 9, in which the time during which the precipitation occurs is at least 30 hours.

11. The process according to claim 8, in which the pH of the suspension ranges from 1.6 to 2.0

12. The process according to claim 8, in which the concentration of FE (III) is $\leq 30\%$ by weight calculated on titanium dioxide.

13. The process according to claim 8, in which the salt of Fe (III) is selected from the class consisting of sulphates, nitrates, perchlorates, and chlorides.

14. The process according to claim 13, in which the selected Fe (III) salt is ferric chloride.

15. The process according to claim 13, in which the pH of the solution is obtained by adding HCL or $HClO_4$.

16. The process according to claim 13, in which titanium dioxide is treated with solutions of heteropolyacids before being utilized.

17. The process according to claim 16, in which the heteropolyacid is selected from the class consisting of tungstophosphoric acid and tungstosilicic acid.

18. The process according to claim 17, in which the heteropolyacid concentration ranges from $10^{-4}$ to $10^{-5}$ moles/liter.

* * * * *